United States Patent [19]

Halpern et al.

[11] Patent Number: 4,738,797

[45] Date of Patent: Apr. 19, 1988

[54] AMINOCARBOXYLIC ACID-TERMINATED POLYOXYALKYLENE CONTAINING EXTREME PRESSURE FUNCTIONAL COMPOSITIONS

[75] Inventors: Yuval Halpern, Skokie; Brian A. Pikelny, Bloomingdale, both of Ill.

[73] Assignee: Borg-Warner Chemicals, Inc., Parkersburg, W. Va.

[21] Appl. No.: 811,909

[22] Filed: Dec. 20, 1985

[51] Int. Cl.$^4$ ............................................ C10M 145/26
[52] U.S. Cl. ............................... 252/49.3; 252/51.5 R; 252/51.5 A; 252/52 A; 252/56 R
[58] Field of Search ................ 252/493, 52 A, 51.5 A

[56] References Cited

U.S. PATENT DOCUMENTS

| | | | |
|---|---|---|---|
| 2,316,606 | 4/1943 | Loder et al. | 260/534 |
| 2,709,178 | 5/1955 | Schlapfer et al. | 260/534 |
| 2,786,869 | 3/1957 | Benneville et al. | 260/534 |
| 2,805,203 | 9/1957 | Knapp et al. | 252/51.5 A |
| 2,830,019 | 4/1958 | Fields | 252/51.5 A |
| 2,879,230 | 3/1959 | Newman et al. | 252/51.5 A |
| 2,917,160 | 12/1959 | Turinsky | 205/2 |
| 3,021,281 | 2/1962 | Matson | 252/51.5 A |
| 3,024,277 | 3/1962 | Hotten | 252/51.5 A |
| 3,186,946 | 6/1965 | Cluhan | 252/49.3 |
| 3,280,029 | 10/1966 | Waldmann | 252/49.5 |
| 3,448,048 | 6/1969 | LeSuer et al. | 252/51.5 A |
| 4,043,925 | 8/1977 | Felton, Jr. | 252/49.3 |
| 4,104,177 | 8/1978 | Caruso | 252/51.5 A |
| 4,107,061 | 8/1978 | Sturwold et al. | 252/51.5 A |
| 4,107,096 | 8/1978 | McEntire et al. | 252/546 |
| 4,185,485 | 1/1980 | Schick et al. | 72/40 |
| 4,239,635 | 12/1980 | Rieder | 252/51.5 A |
| 4,419,105 | 12/1983 | Sung | 44/53 |
| 4,537,694 | 8/1985 | Horodysky | 252/51.5 A |

OTHER PUBLICATIONS

Advertisement for Jeffamine T series, C & E News.

Primary Examiner—William R. Dixon, Jr.
Assistant Examiner—Ellen McAvoy
Attorney, Agent, or Firm—Emily A. Richeson

[57] ABSTRACT

An extreme pressure composition is provided wherein the composition comprises a carrier medium and an aminocarboxylic acid-terminated polyoxyalkylene having at least four oxyalkylene units.

10 Claims, No Drawings

AMINOCARBOXYLIC ACID-TERMINATED POLYOXYALKYLENE CONTAINING EXTREME PRESSURE FUNCTIONAL COMPOSITIONS

BACKGROUND OF THE INVENTION

The present invention relates in general to liquid, semi-liquid and gelled extreme pressure functional compositions which contain an aminocarboxylic acid-terminated polyoxyalkylene.

Aminocarboxylic acid-terminated polyoxyalkylenes having three of fewer oxyalkylene units are known in the art. Known aminocarboxylic acid-terminated polyoxyalkylene compounds include ethylenebis(oxyethylenenitrilo) tetra acetic acid and ethylenebis(oxyethyleneimino) dimalonic acid. Known applications for these compounds include use as chelating agents and use in medical diagnostic tests.

Extreme pressure functional compositions are materials such as cutting fluids, lubricating oils, greases, and functional fluids such as coolants, hydraulic fluids, transmission fluids and brake fluids, which are used under conditions of extreme pressure. Although these compositions may perform additional functions, they are at least partly employed to reduce friction between moving parts in the system in which they are used. Therefore, maintenance of lubricating properties under extreme pressure is important.

The use of diamine compounds in functional compositions, such as cutting fluids, is known in the art. U.S. Pat. No. 4,043,925 to Felton, Jr. discloses a water based liquid for use in cold-forming metal parts which is a solution of a polyalkylene glycol, an extreme pressure additive, an anti-corrosion agent and a defoamer. The extreme pressure additive is a sulfochlorinated fatty acid. An alpha, omega diamine-terminated polyoxyalkylene is disclosed as a possible corrosion inhibitor. Similar diamines are also disclosed by U.S. Pat. No. 3,186,946 to Sluhan and U.S. Pat. No. 2,917,160 to Turinsky. Amino-terminated tertiary polyoxypropylenes are also known as lubricant additives. Other somewhat similar amines are disclosed by U.S. Pat. No. 4,185,485 to Schick et al.

Although these amines have many uses, fluids based on these amines frequently do not perform as well as desired in extreme pressure applications, such as cutting, drilling and tapping, and may result in equipment damage. Therefore a functional composition which maintains its properties under conditions of extreme pressure offers significant practical advantages over many compositions known in the art.

SUMMARY OF THE INVENTION

The present invention is an extreme pressure functional composition which comprises an aminocarboxylic acid-terminated polyoxyalkylene, wherein the polyoxyalkylene has at least four acyalkylene oxide units, and a carrier medium. Preferably, the aminocarboxylic acid-terminated polyoxyalkylene has at least one terminal carboxyaliphatic group for each terminal amino moiety. Aqueous carrier media are preferred.

DETAILED DESCRIPTION OF THE INVENTION

The composition of the present invention is an extreme pressure functional composition which comprises an aminocarboxylic acid-terminated polyoxyalkylene and a carrier medium.

The aminocarboxylic acid-terminated polyoxyalkylene includes a polyoxyalkylene moiety to which the aminocarboxylic acid is attached. The polyoxyalkylene moiety may be made up of any of a variety of oxyalkylene units, such as oxyethylene, oxypropylene, and oxybutylene or mixtures thereof. However, it is preferred that the oxyalkylene units be selected from the group consisting of oxyethylene and oxypropylene and mixtures thereof. Mixtures of oxypropylene and oxyethylene are particularly preferred. The polyoxyalkylene moiety may also include a minor portion of alkylene units, such as ethylene or propylene. However, such alkylene units will usually constitute less than 25% by weight of the polyoxyalkylene moiety.

It is critical to the present invention that the polyoxyalkylene portion of the composition have at least four (4) oxyalkylene units, as polyoxyalkylene compounds having less than four oxyalkylene units generally have extreme pressure properties which are inferior. Polyoxyalkylene moieties having at least seven (7) oxyalkylene units are preferred, with moieties having at least fifteen oxyalkylene units being more preferred. However, the polyoxyalkylene portion may have twenty or thirty or more oxyalkylene units consistent with the present invention.

The polyoxyalkylene portion of the composition may be substantially linear, such as, for example, in compositions of the general formula:

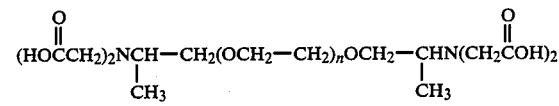

wherein n is at least 4. Alternatively, the polyoxyalkylene portion of the composition may be branched, such as in tertiary or quarternary polyoxyalkylenes, However, substantially linear polyoxyalkylenes are preferred.

According to the present invention, the polyoxyalkylene is terminated with a least one carboxyaliphatic group, as illustrated by the general formula shown below:

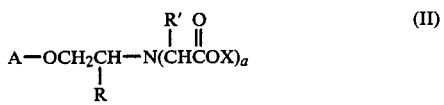

wherein, for the purposes of this formula, A is the non-terminal portion of the molecule, and R is hydrogen, methyl or ethyl, so that the oxyalkylene units are as discussed above.

The group R' of the carboxyaliphatic moiety in formula (II), above, may be hydrogen or any of a variety of aliphatic groups, such as methyl, ethyl, propyl, so that the carboxyaliphatic group is carboxymethylene, carboxyethylene, carboxypropylene or carboxybutylene. It is preferred, however, that the group corresponding to R' in formula (II) be hydrogen or methyl, with hydrogen being most preferred. Mixtures of different carboxyaliphatic moieties may be present in the aminocarboxylic acid polyoxyalklene, although this is usually not preferred.

Consistent with the invention, a in formula (II) above may be equal to 0, 1 or 2, as long as the total number of terminal carboxyaliphatic groups in the composition is equal to at least one. It is preferred, however, that the number of carboxyaliphatic groups be at least equal to the number of terminal amino moieties, and more preferably should be greater, up to the nitrogen valence limit of two terminal carboxyaliphatic groups for each terminal amino moiety. For example, for diamino-terminated linear polyoxyalkylenes it is preferred that at least three carboxyaliphatic groups be present in the compound; however, the number of carboxyaliphatic groups may be no greater than four. When the amino-terminated polyalkylene oxide is a tertiary compound, the number of carboxyaliphatic groups preferably is at least three, but may be no greater than six. Compounds with completely substituted amino groups, that is wherein the number of carboxyaliphatic groups is twice the number of amino groups, are most preferred.

One or more of the carboxyaliphatic groups may be present in the composition either in the acid form, wherein X in illustrative formula (II) above is hydrogen, or in the form of a salt, such as wherein X is calcium, lead (II), magnesium, tin, sodium or an amine. It is preferred that most of all of the carboxyaliphatic groups be present in the acid form. However, when the carboxyaliphatic group is present as a salt, ammonium, and alkali metal and alkaline earth metal salts, such as sodium, potassium, barium and magnesium salt, are preferred. Ammonium salts are most preferred.

The extreme pressure functional composition of the present invention also includes a carrier medium in which the aminocarboxylic acid-terminated polyoxyalkylene is dissolved, emulsified or dispersed. The particular carrier medium selected will depend at least in part on the application intended for the composition. For example, a grease may be selected for the carrier medium when the composition is required to maintain its original position in a mechanism. Water or a low viscosity non-aqueous liquid may be selected when the composition is intended to be used as a functional fluid, or when the composition is intended to also perform a cooling and cleaning function, as is often true of cutting fluids. However, due to the relatively good solubility of many aminocarboxylic acid-terminated polyoxyalkylene in water, aqueous carrier media are often preferred.

Non-aqueous carrier media may be based on a vegetable, animal, synthetic or mineral oil or a mixture thereof, such as caster oil, cottonseed oil, tallow, silicone oils, silicates, fluorinated oils, diesters, chlorinated aromatics, paraffins, phosphazenes, polyglycols, aromatic oils, naphthenic oils, phosphate esters and alkylbenzenes. While petroleum oils are often selected for use in automobile universal joints and wet clutches, synthetic oils are usually selected for high temperature applications wherein petroleum oils tend to oxidize rapidly, or for low temperature applications wherein natural oils may not be fluid. The oil carrier medium also preferably should be selected to be compatible with other system components, as many oils, particularly the synthetics, may cause swelling or degradation of other components such as seals.

Although mineral oils are usually preferred as non-aqueous carrier media, the particular oil selected will depend in part on the intended application. For example, light solvents and neutral oils may be preferred when the composition is intended for use in metal working applications, although sulfurized mineral oils, sulfo-chlorinated fatty mineral oils, heavy-duty compounded emulsions or graphite-in-oil suspensions may be used.

In one embodiment, not necessarily preferred, the carrier medium includes a thickening agent to form a grease. This thickening agent may be an inorganic gelling agent, such as the oleophilic clay Bentonite, or a non-soap organic thickener like polyurea, Teflon, polyethylene or terephthalic acid. In addition or in the alternative, the thickening agent may be a soap. Soap thickening agents generally are metal salts of organic acids, such as myristate, linoleate, linolenate, laurate, stearate, oleate, benzoate, azelate and palmate. Although these organic acids are preferably relatively large, salts of relatively small organic acids, such as acetates, may be included. Mixtures of different salts may also be used. For example, many soaps are derived from tallow, which contains a mixture of aliphatic molecules such as stearin, palmitin and olein. The number of carbon atoms in the organic moiety and the degree of its saturation affect the thickening properties of the soap, with aliphatic soaps having 12 to about 18 carbon atoms giving thickening properties appropriate for most grease applications.

A variety of different metals may be used in making soap thickening agents, such as aluminum, molybdenum, barium, calcium, sodium and lithium. The properties of these metals also effect the properties of the thickening agent and the lubricating greases in which they are used.

Soap thickeners may also be complex soaps, wherein a single metal ion is complexed with two or more dissimilar organic moieties, or wherein a multi-basic organic moiety is used to complex more than one metal. For example, a long chain moiety, such as 12-hydroxy stearic acid, and a relatively short chain moiety, such as acetic acid, may be complexed with the same metal ion, such as in calcium stearate acetate. In the alternative, a di- or tri-basic moiety, such as azelaic, acid, may be complexed with more than one metal ion, such as in dilithium azelate. Mixtures of different soaps may also be used in the same lubricating grease composition.

In the embodiment of the invention which is most preferred, the carrier medium includes water. Such aqueous based compositions may be particularly useful in conjunction with metalworking operations, such a machining, grinding and cutting. Water may serve as the primary carrier medium, or may exist in the composition in the form of an emulsion in oil. However, it is preferred that water be the primary carrier medium, although it may contain other carrier media, such as polyglycols, dissolved therein. Alternatively, other carrier media, such as soluble oils, may be emulsified in the water.

In addition to the aminocarboxylic acid-terminated polyoxyalkylene described above, the composition may include other components which may contribute to the applicability of the composition to a certain use. For example, when the composition is intended for use as a cutting fluid, the composition may additionally include other known cutting fluid additives, such as polyoxyethylene imidazole, triethanolamine, and various phosphate esters such as phosphoric acid esters of poly(2-10)ethyleneoxy n-butane 1,4-diols. Other known additives, such as corrosion inhibitors, antioxidants, antiwear agents and antifoam additives, may also be present.

Preferably, the aminocarboxylic acid-terminated polyoxyalkylene is present in the composition in an amount equal to about 0.01 to about 10% by weight, based on the total weight of the composition. It is more preferred, however, that the aminocarboxylic acid-terminated polyoxyalkylene be present in an amount equal to about 0.05 to about 5% by weight, with about 0.1 to about 2% weight being most preferred.

The aminocarboxylic acid-terminated polyoxyalkylene may be prepared by contacting an amino-terminated polyoxyalkylene with an alpha-halocarboxylic acid in the presence of a base. The amino-terminated polyoxyalkylene is selected to correspond to the amino-terminated polyoxyalkylene moiety of the aminocarboxylic acid-terminated polyoxyalkylene discussed above. Suitable linear and branched amino-terminated polyoxyalkylenes are available from commercial sources or may be synthesized by processes known in the art.

The halocarboxylic acid used in the process of the invention is selected to correspond to the carboxyaliphatic moiety in the aminocarboxylic acid-terminated polyoxyalkylene discussed above. This carboxylic acid is halogenated in the position alpha to the carboxyl moiety. Although the identity of the halogen group on the halocarboxylic acid is not critical to the invention, chlorocarboxylic acids are usually preferred.

It is further preferred that the alpha-halocarboxylic acid be a $C_2$ to about $C_4$ carboxylic acid, such as chloroacetic acid, alpha-chloropropionic acid, and alpha-clorobutyric acid. Chloroacetic acid is most preferred. Mixtures of different alpha-halocarboxylic acids may also be used.

The molar ratio of halocarboxylic acid to terminal amino moiety in the preparation process will depend on the number of terminal carboxyaliphatic groups desired in the reaction product. The molar ratio of carboxylic acid to amino moiety may be less than one, such as 2:3, 1:2 or 1:3, when substitution of each amino moiety is not desired. However, it is preferred that the molar ratio of carboxylic acid to amino moiety be at least 1:1, with ratios of greater than 1:1 being more preferred.

Although reaction of the amino-terminated polyoxyalkylene with the alpha-halocarboxylic acid may take place in the presence of an organic solvent, such as ethanol or toluene, it is preferred that the process take place in an aqueous reaction medium.

The amino-terminated polyoxyalkylene should be contacted with the alpha-halocarboxylic acid in the presence of a base. This base preferably should be a relatively strong base, such as NaOH, KOH and triethylamine. When the reaction of the alpha-halocarboxylic acid with the amino-terminated polyoxyalkylene is conducted in an aqueous reaction medium, it is preferred that the base be present in an amount sufficient to maintain the reaction medium at a pH of at least 8.5. When the reaction is conducted in an organic reaction medium it is preferred that enough base be present in the medium so that the molar ratio of base to acid be at least 1:1, with base:acid ratios of at least 2:1 being more preferred.

It is also preferred that the above process be conducted at a temperature of about 55° C. to about 120° C. and a pressure of about atmospheric to about 50 psi. Temperatures of about 70° C. to about 100° C. and pressures of about atmospheric to about 28 psi are more preferred.

SPECIFIC EMBODIMENTS

Examples 1-6 illustrate the preparation of various aminocarboxylic acid-terminated poloxyalkylenes useful in the composition of the invention.

EXAMPLE 1

A 250 mL four necked round bottom flask, equipped with mechanical stirrer, thermometer, condenser and addition funnel, was charged with 10 g (0.106 M) chloroacetic acid, 37.5 mL deionized water, 7 mL absolute ethanol and 2 drops of an ethanolic solution of phenolphthalein. A 10N NaOH solution was added (12 mL) to neutralize the solution. To this solution was added 20 g (0.01 M) of Jeffamine D-2000 TM, an alpha-omega amine-terminated polyoxyalkylene having, on the average, about 34 oxypropylene units per molecule, obtainable from the Texaco Chemical Company.

The reaction mixture was brought to reflux at about 85° C. Sodium hydroxide solution (10N) was added as needed to keep the reaction mixture slightly basic. The reflux was continued for 20 hrs., after which the reaction mixture was cooled to room temperature. Concentrated HCl was added to bring the pH to 2. The mixture was evaporated to dryness under reduced pressure, at 60° C. The product was separated from NaCl by extracting the product into absolute ethanol. Ethanol was evaporated and the residue was extracted with chloroform to remove hydroxyacetic acid byproduct. The product (23 g), after evaporation of the chloroform, was a clear, tan colored viscous liquid. The structure of this product was confirmed by proton nuclear magnetic resonance (NMR) and infrared spectroscopy (IR) to be tetra (N-carboxymethyl) alpha, omega-diamino polyoxyalkylene. This product was designated as "COMP 1".

EXAMPLE 2

An aminocarboxylic acid-terminated polyoxyalkylene was prepared using the procedure described above in Example 1, except that Jeffamine ED-2001 TM (0.01 M) was substituted for the Jeffamine D-2000 TM as the starting material. The product obtained by this procedure was designated "COMP 2".

EXAMPLE 3

A 250 mL round bottom flask, equipped with stirrer and Dean-Stark column was charged with 115 mL of dry toluene and 22.6 g (0.0 M) Jeffamine ED-2001 TM, an alpha, omega-amine-terminated polyoxyalkylene, obtainable from the Texaco Chemical Company, which has an average of 45 oxyalkylene units per molecule. The solution was refluxed to azeotropically remove residual water. The Dean Stark column was replaced with a condenser. Triethyl amine (8.08 g; 0.08 M) was added at room temperature followed by addition of 3.78 g (0.04 M) chloroacetic acid. The mixture was refluxed for 16 hours and then cooled to room temperature. Triethylamine hydrochloride (5.6 g), confirmed by proton NMR and melting point, was removed by filtration. The toluene and 2 g of triethylamine (determined by Gas Chromatograph) was evaporated, leaving 25.1 g of a tan colored solid product, which has an IR spectrum consistent with that of tetra(N-carboxymethyl)-alpha, omega-diamino polyoxyalkylene. This product was designated "COMP 3".

EXAMPLE 4

An aminocarboxylic acid-terminated polyoxyalkylene was prepared using the procedure described above in Example 3, except that Jeffamine D-2000 TM (0.01 M) was substituted for Jeffamine ED-2001 TM as the starting material. The product obtained by this procedure was designated "COMP 4".

EXAMPLE 5

A 1000 mL four necked round bottom flask, equipped with mechanical stirrer, thermometer, condenser and addition funnel was charged with 7.56 g (0.08 M) chloroacetic acid, 50 mL deionized water and one drop of ethanolic phenolphthalein solution. At room temperature, 11.2 g of 10 1 N NaOH solution was added with stirring, followed by addition of 40 g (0.02 M) Jeffamine ED-2001 TM and heating to 90° C. Fifty mL of deionized water was added and the reaction mixture kept basic by slow addition of 10N NaOH solution. After 20 hours at 90° C., the reaction mixture was cooled to room temperature, brough to pH 2 by adding concentrated HCl and the water evaporated under reduced pressure at 60° C. The resulting white solid was mixed with 300 mL absolute ethanol and the ethanol evaporated at reduced pressure. The remaining solid was dried at 50° C. under vacuum to a constant weight. The dry solid was mixed with 500 mL absolute ethanol and NaCl removed by filtration. The product, 41 g of an off white solid, was obtained by evaporation of the ethanol, and was confirmed by proton NMR and IR spectra to be tetra (N-carboxymethyl) alpha, omega-diamino polyoxyalkylene. Elemental analysis was calculated for $C_{113} H_{221} N_2 O_{57}$, as follows. The percent actually found is indicated in parenthesis. % C=53.86 (52.89); % H=8.84 (9.02); % N=1.11 (1.10); % O=36.28 (36.40). This product was designated "COMP 5".

EXAMPLE 6

A 500 mL four necked round bottom flask, equipped with mechanical stirrer, thermometer, condenser and addition funnel was charged with 3.78 g (0.04 M) chloracetic acid, 50 mL deionized water and one drop of ethanolic phenolphthalein solution. At room temperature, while stirring, 5.6 g of 10N NaOH solution was added, followed by addition of 40 g (0.02 M) Jeffamine ED-2001 TM and heating to 90° C. The reaction mixture was kept basic by slow addition of 10N NaOH solution. After 20 hours at 95° C. the reaction mixture was cooled to room temperature and brought to pH 2 by adding concentrated HCl. The water was evaporated at 60° C. under reduced pressure. The product twice was mixed with 500 mL absolute ethanol and the ethanol removed by evaporation under reduced pressure. Ethanol (350 mL) was added again to the product and the mixture stirred at room temperature and then filtered. The solid was identified as NaCl. The clear ethanolic filtrate was evaporated to dryness under reduced pressure, leaving a waxy residue. The IR spectrum of this product was consistent with that of di(N-carboxymethyl)-alpha, omega diamino polyoxyalkylene. This product was designated "COMP 6".

EXAMPLES 7-14

Extreme pressure properties of compositions including the aminocarboxylic acid-terminated polyoxyalkylenes synthesized in Examples 1-6, consistent with the invention, were tested according to the Falex Pin and Vee Block Method, ASTM Standard No. 3233-73. All compositions were tested in water, with the amount of each of the compositions expressed in Table I, below, in percent by weight, based on 100 parts by weight water. Unless noted otherwise by the superscript "a" in Table I, the water used in each of the formulations was tap water; the letter "a" indicates deionized water was used instead. Triethanol amine, usually about 1 to about 2% by weight based on 100 parts water, was added to each of the formulations tested to bring the pH of the formulation to 9. The maximum load carried by each of these formulations is indicated below in Table I. The superscript letter "b" in Table I indicates that failure occurred while the load was being increased to the weight indicated.

The formula of Example 9 additionally contained 0.02% Ethoduomeen T/13, an N,N',N"-tris(2hydroxyethyl)-N-tallow-1,3-diamine-propane) produced by Armak Industrial Chemicals.

COMPARATIVE EXAMPLES C15 & C16

Each of the diamino-terminated polyoxyalkylenes used to synthesize the compositions tested in Examples 7-14 was tested for extreme pressure properties in combination with hydroxyacetic acid. The identity and amount of these diamino-terminated polyoxyalkylenes and the amount of hydroxyacetic acid employed are indicated below in Table I. These formulae are expressed in terms of percent by weight, based on 100 parts by weight water. The formula for both Comparative Example C15 and C16 were prepared in tap water. Both of these formulae failed at 300 lbs., the weight used initially in performing the test.

COMPARATIVE EXAMPLES C17-C19

The extreme pressure properties of formulations of triethanol amine, in various concentrations, in deionized water were tested according to ASTM Standard No. 2322-73. The maximum load at failure of these formulae is indicated below in Table II.

COMPARATIVE EXAMPLE C20

The extreme pressure properties of a formula of ethylene glycol-bis-(2-aminoethyl ether) N,N,N',N'-tetra acetic acid and triethanol amine in deionized water at pH 9 were tested by ASTM Standard No. 3233-73. The proportions of the compounds in this formulae and the maximum load at failure are indicated below in Table II, as is the maximum load at failure and the formula of the compositions of Example 13.

An examination of the data presented in Table I and Table II indicated that extreme pressure compositions embodying the present invention exhibit significantly improved extreme pressure properties over similar compositions not embodying the invention.

It will be understood that various changes and modifications may be made in the embodiments outlined above without departing from the spirit of the invention, which includes all equivalents and modifications thereof, and is limited only by the following claims.

TABLE I

| EX. NOS. | COMP 1 | COMP 2 | COMP 3 | COMP 4 | COMP 5 | COMP 6 | JEFFAMINE D-2000 | JEFFAMINE ED-2001 | HYDROXYACETIC ACID | MAXIMUM LOAD (lbs) |
|---|---|---|---|---|---|---|---|---|---|---|
| 7 | 0.49[a] | | | | | | | | | 2000[b] |
| 8 | 0.49 | | | | | | | | | 2000 |
| 9 | 0.49[a] | | | | | | | | | 2000 |
| 10 | | 0.49 | | | | | | | | 2250[b] |
| 11 | | | 0.49 | | | | | | | 2250[b] |
| 12 | | | | 0.49 | | | | | | 2000[b] |
| 13 | | | | | 0.49 | | | | | 2250 |
| 14 | | | | | | 0.49 | | | | 2250 |
| C15 | | | | | | | 0.44 | | 0.05 | 300 |
| C16 | | | | | | | | 0.45 | 0.05 | 300 |

TABLE II

FALEX PIN & VEE BLOCK TESTS

| EXAMPLE NUMBER | EGTA | TETRACARBOXYMETHYL POLYOXYETHYLENE DIAMINE | TRIETHANOL AMINE (%) | MAXIMUM LOAD (lbs) |
|---|---|---|---|---|
| C17 | — | — | 1.00 | 300 |
| C18 | — | — | 2.00 | 750 |
| C19 | — | — | 6.50 | 2000 |
| C20 | 0.47 | — | 6.40 | 1875 |
| 13 | — | 0.49 | 1.05 | 2250 |

We claim:

1. An extreme pressure composition comprising a carrier medium and an aminocarboxylic acid-terminated polyoxyalkylene having at least one terminal carboxyaliphatic group for each terminal amino moiety, the carboxyaliphatic groups havaing 2 to 5 carbon atoms, and the polyoxyalkylene having at least fifteen oxyalkylene units.

2. The extreme pressure composition of claim 1 wherein said carrier medium includes water.

3. The composition of claim 1 wherein the oxyalkylene units are selected from the group consisting of oxyethylene, oxypropylene and mixtures thereof.

4. The composition of claim 1 wherein said aminocarboxylic acid-terminated polyoxyalkylene has a polyoxyalkylene moiety which is substantially linear.

5. The composition of claim 1 wherein said amino carboxylic acid-terminated polyoxyalkylene has two terminal carboxyaliphatic groups for each terminal amino moiety.

6. The composition of claim 1 wherein said aminocarboxylic acid-terminated polyoxyalkylene is in the form of a salt.

7. The composition of claim 1 wherein said aminocarboxylic acid-terminated polyoxyalkylene has at least one terminal carboxyaliphatic moiety selected from the group consisting of carboxymethylene and carboxyethylene.

8. The composition of claim 1 wherein said aminocarboxylic acid-terminated polyoxyalkylene is present in an amount equal to about 0.01 to about 10% by weight, based on the total weight of the composition.

9. The composition of claim 8 wherein said aminocarboxylic acid-terminated polyoxyalkylene is present in an amount equal to about 0.05 to about 5% by weight.

10. The composition of claim 9 wherein said aminocarboxylic acid-terminated polyoxyalkylene is present in an amount equal to about 0.1 to about 2% by weight.

* * * * *